United States Patent [19]

Eida et al.

[11] 4,435,717
[45] Mar. 6, 1984

[54] LIQUID JET RECORDING PROCESS AND RECORDING LIQUID THEREFOR

[75] Inventors: Tsuyoshi Eida, Chiba; Masatsune Kobayashi, Yokohama, both of Japan

[73] Assignee: Canon Kabushiki Kaisha, Tokyo, Japan

[21] Appl. No.: 360,645

[22] Filed: Mar. 22, 1982

[30] Foreign Application Priority Data

Apr. 10, 1981 [JP] Japan .................................. 56-54562

[51] Int. Cl.³ ........................ G01D 9/00; G01D 15/16
[52] U.S. Cl. .................................. 346/1.1; 346/140 R
[58] Field of Search ........................ 346/1.1, 75, 140; 106/22; 260/DIG. 38

[56] References Cited

U.S. PATENT DOCUMENTS

| 2,022,678 | 12/1935 | Kritchevsky et al. | 106/22 UX |
| 3,889,271 | 6/1975 | Freytag et al. | 346/140 IJ X |
| 4,142,905 | 3/1979 | Cooke | 106/22 |
| 4,164,745 | 8/1979 | Cielo et al. | 346/140 PD |
| 4,166,044 | 8/1979 | Germonprez et al. | 106/22 X |
| 4,229,747 | 10/1980 | Hwang | 346/140 IJ |

*Primary Examiner*—Donald A. Griffin
*Attorney, Agent, or Firm*—Fitzpatrick, Cella, Harper & Scinto

[57] ABSTRACT

A liquid jet recording process comprising exerting thermal energy to a recording liquid to form liquid droplets and performing recording with these liquid droplets, is characterized in that said recording liquid comprises at least a dye having in the molecule 1 to 5 members selected from the group consisting of sulfo group and carboxyl group, 1 to 4 azo groups, 1 to 6 hydroxyl groups, 0 to 2 imino groups, and no amino group and a thermal decomposition point of 250° C. or more, and a liquid medium therefor. A recording liquid comprises at least a dye, as a recording agent, having in the molecule 1 to 5 members selected from the group consisting of sulfo group and carboxyl group, 1 to 4 azo groups, 1 to 6 hydroxyl groups, 0 to 2 imino groups, and no amino group and a thermal decomposition point of 250° C. or more, and a liquid medium therefor.

12 Claims, 2 Drawing Figures

LIQUID JET RECORDING PROCESS AND RECORDING LIQUID THEREFOR

BACKGROUND OF THE INVENTION

1. Field of the Invention

The present invention relates to a process for recording by jetting liquid droplets through a spout (orifice) with thermal energy and to a recording liquid effectively applicable to said process, in particular to a recording liquid excellent in thermal stability.

2. Description of the Prior Art

Non-impact recording processes have become of interest in recent years in that they generate noises in a negligible degree during recording operation. Among these processes, a very powerful method is the so-called ink jet recording process (the liquid jet recording process), which is capable of high-speed recording, in addition, onto plain paper, requiring no special treatment like so-called fixing. Accordingly, until now a variety of techniques for this process and devices for realizing them have been proposed, some of them having been commercialized by adding improvements and some others being under developments to which many efforts are now continuously exerted for commercialization.

Of these techniques, for example, the liquid jet recording processes disclosed in Japanese Patent Kokai No. 51837/1979 and German Patent Offen (DOLS) No. 2843064 are distinguished from other liquid jet recording processes in the characteristic of excerting thermal energy to a liquid as energy for producing liquid droplets, thereby gaining driving force for jetting of liquid droplets.

That is to say, in these recording processes, the liquid subjected to the action of thermal energy undergoes a state change accompanied by an abrupt increase in its volume, and the liquid droplets are jetted from an orifice in a recording head with the force caused by said state change, and fly and adhere to recording paper or the like, thus recording being accomplished.

In particular, the liquid jet recording process of DOLS No. 2843064 has advantages in that it can not only be effectively applied to the so-called drop-on demand recording, but readily realize a high-density multi-orifice recording head of full line type, thereby achieving high-speed recording of image of high resolution and high quality.

While having such various advantages, said liquid jet recording process needs to be improved in the life span in repeated use, i.e., the durability, of recording head for the purpose of recording a high resolution and high quality image over long hours at a high speed or in order to extend the service life of recording heat outstandingly.

Factors determining the service life of the recording head applied to such a recording process include, besides the life of an electric energy-thermal energy transforming element employed, the deposition of solids onto the surface of said transforming element. That is, in the liquid jet recording process of the above-mentioned patent, the recording liquid, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of recording liquid is very important for continuing high-speed recording for long hours by use of such apparatus.

SUMMARY OF THE INVENTION

The first object of this invention to provide a liquid jet recording process utilizing thermal energy which permits a stable recording for a long period of time.

The second object of the invention is to provide such a recording liquid applicable to the liquid jet recording process utilizing thermal energy that can strikingly extend the service life of recording head, remarkably enhance the reliability of the process, and by far reduce the failure rate of the apparatus.

According to one aspect of the present invention, there is provided a liquid jet recording process comprising exerting thermal energy to a recording liquid to form liquid droplets and performing recording with these liquid droplets which is characterized in that said recording liquid comprises at least a dye having in the molecule 1 to 6 hydroxyl groups and no amino group and, 1 to 5 members selected from the group consisting of a sulfo group and a carboxyl group, 1 to 4 azo groups, and 0 to 2 imino groups, and a thermal decomposition point of 250° C. or more, and a liquid medium therfor.

According to another aspect of the present invention, there is provided a recording liquid comprising at least a dye, as a recording agent, having in the molecule 1 to 6 hydroxyl groups and no amino group and, 1 to 5 members selected from the group consisting of a sulfo group and a carboxyl group, 1 to 4 azo groups, and 0 to 2 imino groups, and a thermal decomposition point of 250° C. or more, and a liquid medium therefor.

DETAILED DESCRIPTION OF PREFERRED EMBODIMENT

Figure 1A:
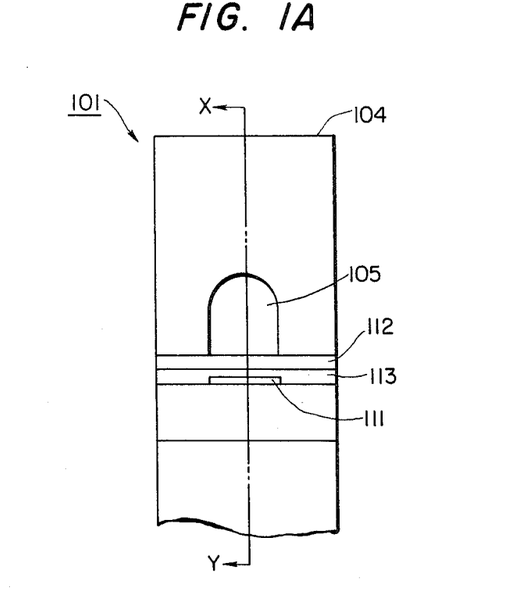
FIG. 1A shows a partial elevational section of a recording head across its orifice, for use in carrying out this invention.
Figure 1B:
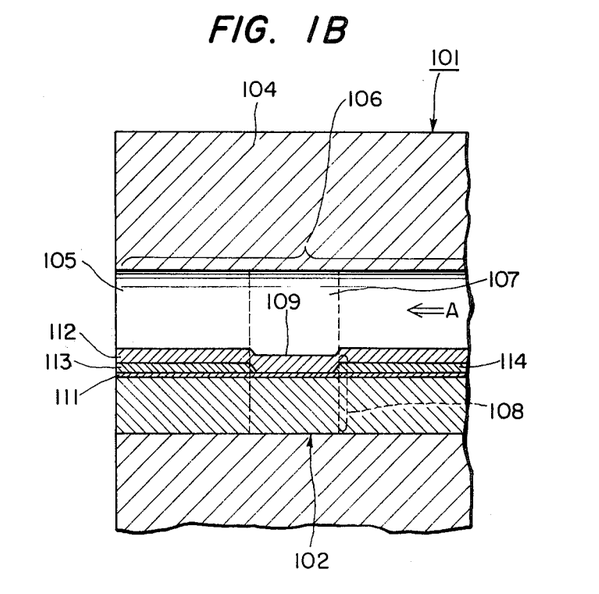
FIG. 1B is a partial cross-sectional view taken along the one-dot-dash line X—Y of FIG. 1A.

The recording head used in the liquid jet recording process of this invention has a construction such as for example, shown in FIGS. 1A and 1B. in the figures, an electric energy-thermal energy transforming element 102 is in contact with the liquid which has been introduced from the arrow A side and is passing in a heating zone 107, that is, liquid droplets producing energy exerting zone, through a heat applying surface 109, that is, an energy exerting surface. This construction has been adopted for the purpose of effective and efficient exertion of the generated thermal energy, that is, the liquid droplets producing energy, to the liquid passing through the heating zone 107.

For this purpose, an upper layer 112 is formed on a heat generating resistor layer 111 in a heat applying region 108 when fabricating the recording head. This upper layer 112 is to prevent electric leakage from occurring across electrodes 113 and 114 through the recording liquid as well as to protect the heat generating resistor layer 111 from the recording liquid or thermal oxidation. It is to be noted here that occurrence of the electric leakage through the electrodes depends, of course, upon the nature of the recording liquid used, and the one intended for use here is an ordinary recording liquid containing water as the liquid medium.

The principle of liquid droplet formation in the recording process which uses such a recording head is as follows: as mentioned above, when the input power to the electric energy-thermal energy transforming element is turned on, the recording liquid in the heating zone 107, receiving the thermal energy as the liquid droplet producing energy, undergoes a state change accompanied by an abrupt increase in its volume, that is to say, the recording liquid in the heating zone 107 reaches a vapor state in an instantaneous time, say, μ second or less, and bubbles are produced and grow instantaneously, whereby the recording liquid present between said heating zone 107 and an orifice 105 is discharged in the form of liquid droplets.

The recording liquid of this invention is obtained as a liquid composition so-called ink, by compounding a recording agent dye, described later in detail, with a suitable solvent such as water or an organic solvent, and if necessary, properly with some other additives such as surface tension modifiers, viscosity modifiers, and the like. In the recording by use of said recording liquid and such a recording head as shown in FIGS. 1A and 1B, the service life of recording head is improved to a great extent as shown in Examples later, compared with the recording by use of the conventional recording liquid.

The recording agent used as an active ingredient in the recording liquid of this invention is defined as a dye having 1 to 6 hydroxyl groups and no amino group and, 1–5 members selected from the group consisting of a sulfo group and a carboxyl group, 1–4 azo groups, and 0–2 imino groups, and in adition a thermal decomposition point of at least 250° C.

As examples of such dyes may be cited dyes of the following chemical structure wherein represents benzene ring and naphthalene ring:

No. 1

No. 2

No. 3

No. 4

No. 5

No. 6

-continued

No. 7

No. 9

No. 10

No. 11

No. 12

No. 13

No. 14

No. 15

No. 16

No. 17

No. 19

No. 20

No. 21

No. 22

No. 23

No. 24

No. 25

No. 26

No. 27

No. 28

No. 29

No. 30

No. 31

No. 32

No. 34

No. 35

Among the above-mentioned dyes, excellent results are obtained by using any one of the dyes Nos. 1, 4, 7, 9, 11, 21, 22, 24, 25, 26, 27, 28 and 29. Good results are obtained by using any one of the dyes Nos. 2, 5, 6, 12, 13, 14, 15, 16, 17, 19, 20, 23, 30, 34 and 35. The dyes Nos. 3, 10, 31 and 32 can be used in practice.

The content of said recording agent dye in the recording liquid, though determined depending upon the kinds of the medium components required characteristics of the recording liquid, etc., is generally 0.5–20%, preferably 0.5–15%, and more preferably 1–10%, by weight based on the total weight of recording liquid.

The recording liquid medium of this invention is composed primarily of water or ethylene glycol monomethyl ether; however, such solvents may be used not only singly but also preferably in combination with other water-soluble organic solvents of various types. These water-soluble organic solvents include $C_1$–$C_4$ alkyl alcohols such as methanol, ethanol, n-propanol, isopropanol, n-butanol, sec-butanol, tert-butanol, isobutanol, and the like; amides such as dimethylformamide, dimethylacetamide, and the like; ketones or keto alcohols such as acetone, diacetone alcohol, and the like; ethers such as tetrahydrofuran, dioxane, and the like; polyalkylene glycols such as polyethylene glycol, polypropylene glycol, and the like; $C_2$–$C_6$ alkylene group-containing alkylene glycols such as ethylene glycol, propylene glycol, butylene glycol, triethylene glycol, 1,2,6-hexane triol, thio diglycol, hexylene glycol, diethylene glycol, and the like; glycerol; and lower alkyl ethers of polyhydric alcohols such as ethylene glycol methyl ether, diethylene glycol methyl and ethyl ethers, triethylene glycol monomethyl and monoethyl ethers, and the like.

Among these various water-soluble organic solvents, preferred ones are polyhydric alcohols such as diethylene glycol and the like, and lower alkyl ethers of polyhydric alcohols such as triethylene glycol monomethyl and monoethyl ethers, and the like.

The contents of said water-soluble organic solvents in the recording liquid are generally 5–95%, preferably 10–80%, and more preferably 20–50%, by weight based on the total weight of recording liquid.

The water content in these cases, though chosen from a wide range depending upon the kinds and compositions of solvent components or upon desired characteristics of the recording liquid, is generally 10–90%, preferably 10–70%, and more preferably 20–70%, by weight based on the total weight of recording liquid.

The recording liquid prepared from these ingredients, in this invention, is excellent, as it is, being well-balanced in recording characteristics (signal response properties, stability of liquid droplet formation, stability of jetting, long-term continuous recording performance characteristics, and stability of re-jetting after a long pause of recording), preservation stability, fixing property on recording paper or the like, and light resistance, weather resistance, and water resistance of recorded image. In order to further improve these characteristics, some of various additives hitherto known may be also added thereto.

Such additives include, for example, viscosity modifiers such as poly (vinyl alcohol), celluloses, other water-soluble resins, and the like; various cationic, anionic or nonionic surfactants; surface tension modifiers such as diethanolamine, triethanolamine, and the like; solvents for solubilization of dye such as N-methyl-2-pyrrolidone, 1,3-dimethyl-2-imidazolidinone, and the like; and pH regulators as buffer solutions.

Referring to Examples, this invention will illustrate more specifically together with effects thereof, hereinafter.

EXAMPLE 1

A SiO$_2$ layer (lower layer) 5μ thick was formed over an alumina substrate by sputtering, substequently a 1000 Å HfB$_2$ layer as a heat generating resistor layer and a 3000 Å aluminum layer as an electrode were successively laid thereover, and then a heat generating resistor pattern having size of 50μ×200μ was formed by selective etching of said aluminum layer. A SiO$_2$ layer 3500 Å thick as a protective layer (upper layer) was then laid thereover, thus an electric energy-thermal energy transforming element being formed on the substrate. A glass plate on which a gloove 50μ wide and 50μ deep have been engraved was bonded onto said SiO$_2$ protective layer so as to accord the gloove with the heat generating resistor. The tip surface of orifice was then polished so that the distance betweeen the tip of heat generating resistor and the tip surface of orifice was then polished so that the distance between the tip of heat generating resistor and the tip surface of orifice might become 250μ, thus a recording head being made up. Using this recording head, an ink having the following composition was jetted.

| Dye of structural formula No. 22 (thermal decomposition point: 280° C.) | 5 wt parts |
|---|---|
| Diethylene glycol | 25 wt parts |
| N—methyl-2-pyrrolidone | 20 wt parts |
| Water | 50 wt parts |

The recording head was operated by applying printing signals of 10μ sec.×40 V rectangular voltage pulse at a cycle of 200μ sec., with the result that the recording head showed a sufficient life span to continue printing for 160 hours.

On the other side, the recording head was operated, as a comparative example, under the same conditions as the above, using an ink having the same composition as the above ink except for containing a dye of the structural formula in place of the dye of structural formula No. 22. As a result, its continuous printing life span was 10 hours.

EXAMPLE 2

The recording head was operated similarly to Example 1 using inks having the respective compositions listed in the following Table 1 in place of the ink containing the dye of structural formula No. 22, by applying printing signals of 10μ sec.×50 V rectangular voltage pulse at a cycle of 200μ sec. The resulting endurance times (life spans) are shown in Table 1.

TABLE 1

| | Composition of ink | | |
|---|---|---|---|
| Dye No. | Thermal decomposition point (°C.) | Content (wt %) | Endurance time (hr) |
| 4 | 300 | 5 | 120 |
| 7 | 260 | 6 | 180 |
| 12 | 280 | 5 | 170 |
| 17 | 300 | 7 | 120 |
| 19 | 270 | 5 | 150 |
| 21 | 260 | 5 | 120 |
| 23 | 260 | 6 | 160 |
| 24 | 290 | 7 | 170 |
| 25 | 280 | 6 | 130 |
| 29 | 280 | 5 | 120 |

For comparison, Table 2 shows the endurance times of the recording head when printing tests were carried out under the same conditions as the above using the dyes listed in Table 2, in place the dyes used in the above, the dyes used in these comparative experiments having each amino group and a basic molecular skeleton equal to that of the corresponding dye (having number) used in the above experiments. In the chemical structure in Table 2, represents benzene ring and naphthalene ring.

TABLE 2

| Chemical structure of dye | Content (wt %) | Endrance time (hr) |
|---|---|---|
|  | 5 | 20 |

TABLE 2-continued

| Chemical structure of dye | Content (wt %) | Endurance time (hr) |
|---|---|---|
| [dye structure] | 6 | 16 |
| [dye structure] | 5 | 25 |
| [dye structure] | 7 | 12 |
| [dye structure] | 5 | 22 |
| [dye structure] | 5 | 8 |
| [dye structure] | 6 | 25 |
| [dye structure] | 7 | 22 |
| [dye structure] | 6 | 13 |
| [dye structure] | 5 | 11 |

EXAMPLE 3

The same results an Example 1 were obtained when triethanolamine was used in place of N-methyl-2-pyrrolidone used in Example 1.

EXAMPLE 4

Approximately the same results as Example 2 were obtained when ethylene glycol monomethyl ether was used in place of water, used as a medium of each ink in Example 2.

What we claim is:

1. A liquid jet recording process comprising exerting thermal energy to a recording liquid to form liquid droplets and performing recording with these liquid droplets, which is characterized in that said recording liquid comprises at least a dye having in the molecule 1 to 6 hydroxyl groups and no amino group and 1 to 3 members selected from the group consisting of a sulfo group and a carboxyl group, 1 to 4 azo groups, and 0 to 2 imino groups, and a thermal decomposition point of 250° C. or more and a liquid medium therefor.

2. A liquid jet recording process of claim 1, wherein said liquid medium is composed mainly of water.

3. A liquid jet recording process of claim 1, wherein said liquid medium is composed mainly of ethylene glycol monomethyl ether.

4. A liquid jet recording process of claim 1, wherein said liquid medium is a mixture of water and a water-soluble organic solvent.

5. A liquid jet recording process of claim 1, wherein the content of said dye in said recording liquid ranges from 0.5 to 20% by weight based on the total weight of recording liquid.

6. A liquid jet recording process of claim 1, wherein said liquid medium contains N-methyl-2-pyrrolidone and/or 1,3-dimethyl-2-imidazolidinone.

7. A recording liquid comprising at least a dye, as a recording agent, having in the molecule 1 to 6 hydroxyl groups and no amino group and 1 to 5 members selected from the group consisting of a sulfo group and a carboxyl group, 1 to 4 azo groups, and 0 to 2 imino groups, and a thermal decompsoition point of 250° C. or more, and a liquid medium therefor.

8. A recording liquid of claim 7, wherein said liquid medium is composed mainly of water.

9. A recording liquid of claim 7, wherein said liquid medium is composed mainly of ethylene glycol monomethyl ether.

10. A recording liquid of claim 7, wherein said liquid medium is a mixture of water and a water-soluble organic solvent.

11. A recording liquid of claim 7, wherein the content of said dye in said recording liquid ranges from 0.5 to 20% by weight based on the total weight of recording liquid.

12. A recording liquid of claim 7, wherein said liquid medium contains N-methyl-2-pyrrolidone and/or 1,3-dimethyl-2-imidazolidinone.

* * * * *

UNITED STATES PATENT AND TRADEMARK OFFICE
CERTIFICATE OF CORRECTION

PATENT NO. : 4,435,717
DATED : March 6, 1984
INVENTOR(S) : TSUYOSHI EIDA, ET AL.

It is certified that error appears in the above-identified patent and that said Letters Patent is hereby corrected as shown below:

Column 2, line 46, after "1B." change "in" to -- In --

Column 4, line 5, after "having" insert -- in the molecule --

Column 11, lines 25 to 27, after "orifice" delete "was then polished so that the distance between the tip of heat generating resistor and the tip surface of orifice" second occurrence Signed and Sealed this Nineteenth Day of June 1984

[SEAL]

Attest:

Attesting Officer

GERALD J. MOSSINGHOFF

Commissioner of Patents and Trademarks